(12) United States Patent
White et al.

(10) Patent No.: US 12,309,264 B2
(45) Date of Patent: May 20, 2025

(54) DIGITAL TRANSACTIONS USING QUANTUM TECHNOLOGY

(71) Applicant: BRITISH TELECOMMUNICATIONS PUBLIC LIMITED COMPANY, London (GB)

(72) Inventors: Catherine White, London (GB); Jonathan Roscoe, London (GB)

(73) Assignee: British Telecommunications Public Limited Company, London (GB)

(*) Notice: Subject to any disclaimer, the term of this patent is extended or adjusted under 35 U.S.C. 154(b) by 201 days.

(21) Appl. No.: 17/995,175

(22) PCT Filed: Mar. 22, 2021

(86) PCT No.: PCT/EP2021/057298
§ 371 (c)(1),
(2) Date: Sep. 30, 2022

(87) PCT Pub. No.: WO2021/197904
PCT Pub. Date: Oct. 7, 2021

(65) Prior Publication Data
US 2023/0327861 A1     Oct. 12, 2023

(30) Foreign Application Priority Data
Mar. 31, 2020   (EP) .................................. 20167092

(51) Int. Cl.
*H04L 9/08*     (2006.01)
*H04B 10/70*    (2013.01)

(52) U.S. Cl.
CPC .......... *H04L 9/0852* (2013.01); *H04B 10/70* (2013.01)

(58) Field of Classification Search
None
See application file for complete search history.

(56) References Cited

U.S. PATENT DOCUMENTS

| 2012/0134675 A1* | 5/2012 | Munro .................. H04B 10/70 398/58 |
| 2013/0315395 A1 | 11/2013 | Jacobs |
| 2016/0285621 A1 | 9/2016 | Yuen |

(Continued)

FOREIGN PATENT DOCUMENTS

| CA | 3041617 A1 | 11/2019 |
| CN | 110474765 A | 11/2019 |

OTHER PUBLICATIONS

Bruss D., et al., "Quantum Cryptography," ACM Computing Surveys, vol. 39, Issue 2, 2007, 27 pages.

(Continued)

*Primary Examiner* — Syed A Roni
(74) *Attorney, Agent, or Firm* — EIP US LLP

(57) ABSTRACT

There is herein provided a method of quantum communication, the method including indicating to a quantum receiving apparatus that a first sequence of mutually non-orthogonal bases will be used to prepare at least some of a plurality of bits in quantum states, at a quantum transmitting apparatus, preparing each of the plurality of bits in a respective one of a second sequence of mutually non-orthogonal bases, to give a plurality of qubits, wherein the second sequence of mutually non-orthogonal bases is different to the first sequence of mutually non-orthogonal bases.

11 Claims, 3 Drawing Sheets

(56) References Cited

U.S. PATENT DOCUMENTS

2017/0054556 A1* 2/2017 Fu .................... H04L 9/0852
2019/0312734 A1 10/2019 Wentz et al.
2022/0173895 A1* 6/2022 Lord .................. H04L 9/0825

OTHER PUBLICATIONS

Cai X., et al., "Fair and Optimistic Contract Signing Based on Quantum Cryptography," International Journal of Theoretical Physics, vol. 58, No. 11, Aug. 3, 2019, 7 pages.
Cai Z., et al., "A Blockchain Smart Contract Based on Light-Weighted Quantum Blind Signature," IEEE Access, vol. 7, 2019, pp. 138657-138668.
Combined Search and Examination Report under Sections 17 and 18(3) for Great Britain Application No. 2004695.9, mailed on Dec. 2, 2020, 9 pages.
Extended European Search Report for Application No. 20167092.4 mailed on Oct. 19, 2020, 9 pages.
International Search Report and Written Opinion for Application No. PCT/EP2021/057298, mailed on Jun. 22, 2021, 13 pages.
Paunkovic N., et al., "Fair and Optimistic Quantum Contract Signing," Oct. 18, 2011, 11 pages.
Yadav P., et al., "Quantum Contract Signing with Entangled Pairs," Quantum Physics, Sep. 3, 2019, arXiv:1711.09843v4, 24 pages.

* cited by examiner

DIGITAL TRANSACTIONS USING QUANTUM TECHNOLOGY

PRIORITY CLAIM

The present application is a National Phase entry of PCT Application No. PCT/EP2021/057298, filed Mar. 22, 2021, which claims priority from EP Patent Application No. 20167092.4, filed Mar. 31, 2020 each of which is hereby fully incorporated herein by reference.

BACKGROUND

Distributed ledger (or blockchain) technology uses cryptographically signed chains of transactions to record the transfer of digital assets. In many implementations, these assets have a monetary value associated with them. There may be multiple types of assets on a blockchain, so for example a data asset may be transferred in exchange for some monetary value.

Distributed Ledger Technology enables "trustless" transactions thanks to the ability of all participants to validate transactions. However, in more complex transactions known as smart contracts, assets cannot always be adequately secured. For example, the delivery of digital assets as part of a transaction can be confirmed by the sender or the receiver, but this presents a byzantine problem, as it is difficult to prove that the receiver has received the digital assets.

Data on a blockchain is visible to all participants, though in some implementations side channels may be used to enable the exchange of information in secrecy. The participants in those side channels provide cryptographic hashes that summarize their transactions, without giving the details.

However, participants in those side channels may be misled or come to some disagreement with no facility for remediation. For example, in some situations, it is not clear whether a consumer has accessed the asset that is the subject of the transaction. It is therefore not clear whether the transaction should be added to the blockchain. The way around this is the use of third-parties providing escrow services, but that relies on trust in those third-parties. In particular, the third party asset may need to have a copy of valuable or confidential digital assets, which is not desirable.

SUMMARY

It is desirable to overcome and/or mitigate some or all of the above-mentioned and/or other disadvantages associated with convention approaches.

According to a first aspect of the disclosure there is provided a method of transmitting quantum-encrypted data from a quantum transmitting apparatus to a quantum receiving apparatus, the method comprising: indicating to a quantum receiving apparatus that a first sequence of mutually non-orthogonal bases will be used to prepare at least some of a plurality of bits in quantum states, at a quantum transmitting apparatus, preparing each of the plurality of bits in a respective one of a second sequence of mutually non-orthogonal bases, to give a plurality of qubits, wherein the second sequence of mutually non-orthogonal bases is different to the first sequence of mutually non-orthogonal bases.

As the receiving apparatus does not know which bases some of the qubits were prepared in, it may measure them using a different basis. This will give a random value which may differ to the one that was encoded onto the qubit. Thus, if the receiving apparatus measures the plurality of qubits, the receiving apparatus will not measure the correct bit values for at least some of the transmitted plurality of qubits. Thus, comparing the bit values of the measured qubits with those of the transmitted qubits would reveal whether or not the receiving apparatus measured the qubits. This ability to check whether the receiving apparatus measured the qubits discourages the receiving party from falsely claiming not to have done so.

The first sequence of mutually-orthogonal bases contains some but not all of the bases in the second sequence of mutually-orthogonal bases. The method may further comprise, at the quantum receiving apparatus, measuring the plurality of qubits according to the first sequence of mutually non-orthogonal bases.

The method may be performed using either the prepare-and-measure or quantum entanglement QKD protocols.

Some of the bases in the second sequence of mutually non-orthogonal bases are different to the bases at corresponding locations in the first sequence of mutually non-orthogonal bases. In some embodiments less than 5% of the second sequence of mutually non-orthogonal bases are different to the bases at corresponding locations in the first sequence of mutually non-orthogonal bases. In some embodiments less than 10% of the second sequence of mutually non-orthogonal bases are different to the bases at corresponding locations in the first sequence of mutually non-orthogonal bases.

By "sequence of mutually non-orthogonal bases" it is meant "a sequence of bases selected from a list of bases that are non-orthogonal to one another". If, for example, the basis set of the BB84 protocol is being used, the sequence of non-orthogonal basis states may contain diagonal and rectilinear basis states, which may be physically prepared using any physical parameter of the photon, for example phase or polarization.

The plurality of bits may be a plurality of data-encoded photons. The quantum transmitting apparatus may comprise a quantum transmitter. The method may further comprise transmitting the plurality of qubits from the quantum transmitter to the quantum receiver apparatus along an optical channel which may be an optical fiber or may be free space.

Preparing each of a plurality of bits in a respective one of a second sequence of non-orthogonal basis states may comprise preparing each of the plurality of bits in respect to one of the first sequence of mutually non-orthogonal basis states, and then replacing a portion of the resulting qubits with replacement qubits prepared in non-orthogonal basis states not known to the quantum receiving apparatus. Replacing the portion of resulting qubits may be performed by a second quantum transmitter and may comprise transmitting the replacement qubits onto the optical channel. This may be done via an optical inlet in the optical channel.

The replacement qubits may be prepared by modulating data onto photons and preparing the resulting modulated photons in mutually non-orthogonal basis states. The second quantum transmitter may be located in an intermediary device which may be a separate device to the quantum transmitter and may be owned by a different party to the quantum transmitter. The separate device may be a device with is trusted to write transactions to the blockchain.

In some embodiments, less than 5% of the plurality of qubits are replacement qubits. In some embodiments less than 10% of the plurality of qubits are replacement qubits. In one embodiment the proportion of the plurality of qubits that are replacement qubits increases with the background error rate. The method may further comprise measuring the background error rate in the channel and setting the basis state proportions accordingly.

The method may further comprise modulating a data stream onto photons to produce the plurality of bits. An error correction code may be applied to the data stream prior to performing the modulating. The data stream may comprise an asset which may be digital content that may be the subject of a smart contract. Such digital content may include a movie or sporting event. In preferred embodiments the data stream comprises an encryption key for decrypting encrypted digital content that is the subject of a smart contract. In these embodiments, the encrypted digital content may be transmitted between the parties to the contract by classical means.

Following, at the quantum receiving apparatus, measuring the plurality of qubits according to a second sequence of non-orthogonal basis states, the method may further comprise applying an error correction code to the measured plurality of qubits to produce output data. The error correction code may be the same error correction code scheme that was used in preparing the qubits for transmission. The output data may be digital content, in which case the method may further comprise consuming the output data. In some embodiments, the output data may be an encryption key for decrypting encrypted digital content. The method may further comprise using the output data to decrypt encrypted digital content.

The method may further comprise repeatedly performing, at a quantum transmitting apparatus, preparing each of a plurality of bits in a respective one of a first sequence of non-orthogonal bases, to give a plurality of qubits. In some embodiments, this is performed continuously. This has the benefit that the receiver can "dip-in" to the transmitted signal at a time that is convenient to the receiving party.

In some embodiments, the receiving apparatus may return the transmitted plurality of qubits to the transmitting apparatus, such as to the intermediary device component of the transmitting apparatus. The receiving apparatus may use a switch to achieve this by redirecting incoming qubits to the transmitting apparatus over a return channel that may be an optical fiber. The transmitting apparatus may measure the bit values of the returned plurality of qubits using a quantum receiver. The transmitting apparatus may compare the bit values of the returned stream with those of the transmitted plurality of qubits. If more than a threshold proportion of these bit values do not match, the transmitting apparatus may determine that the receiving apparatus has measured the plurality of qubits. The transmitting apparatus may then add its signature to the blockchain indicating that the receiving apparatus has successfully obtained the content. If less than a threshold proportion of these bit values do not match, the transmitting apparatus may determine that the receiving apparatus has not measured the plurality of qubits. In such a situation, the transmitting apparatus may not add its signature to the blockchain.

The threshold proportion of matching bit values may depend on the background error rate in the optical channel. In particular, the larger the background error rate in the channel, the greater the threshold proportion of non-matching values that must be reached before it is determined that the receiving apparatus has measured the plurality of qubits. The method may comprise measuring the background error rate on the transmission channel and/or the return channel and use this measurement to set the threshold.

In some embodiments, the plurality of qubits is split into portions and each portion is provided to the receiving apparatus over a separate optical channel. The portions may each encode a component part of a digital asset such as an encryption key and all the component parts must be combined in order to obtain the digital asset. In some embodiments, the method according to the first aspect of the disclosure is performed in respect of each of the portions of the plurality of qubits. The plurality of qubits may be split into more than 2 or more than 5 or more than 20 portions. In these embodiments there may be a plurality of intermediary devices as defined in the first aspect of the disclosure.

In some embodiments, each of the basis states in the first sequence of basis states are the same.

According to a second aspect of the disclosure there is provided a system for transmitting quantum-encrypted data from a quantum transmitting apparatus to a quantum receiving apparatus, the system comprising: a quantum transmitting apparatus and a quantum receiving apparatus, the quantum transmitting apparatus being operable to indicate to the quantum receiving apparatus that a first sequence of non-orthogonal bases will be used to prepare at least some of a plurality of bits in quantum states, the quantum transmitting apparatus being further operable to prepare each of a plurality of bits in a respective one of a second sequence of non-orthogonal bases, to give a plurality of qubits, wherein the second sequence of mutually non-orthogonal bases is different to the first sequence of mutually non-orthogonal bases.

BRIEF DESCRIPTION OF THE DRAWINGS

A specific embodiment of the disclosure will now be described in detail, for illustration only, and with reference to the appended figures, in which.

DETAILED DESCRIPTION

Figure 1:
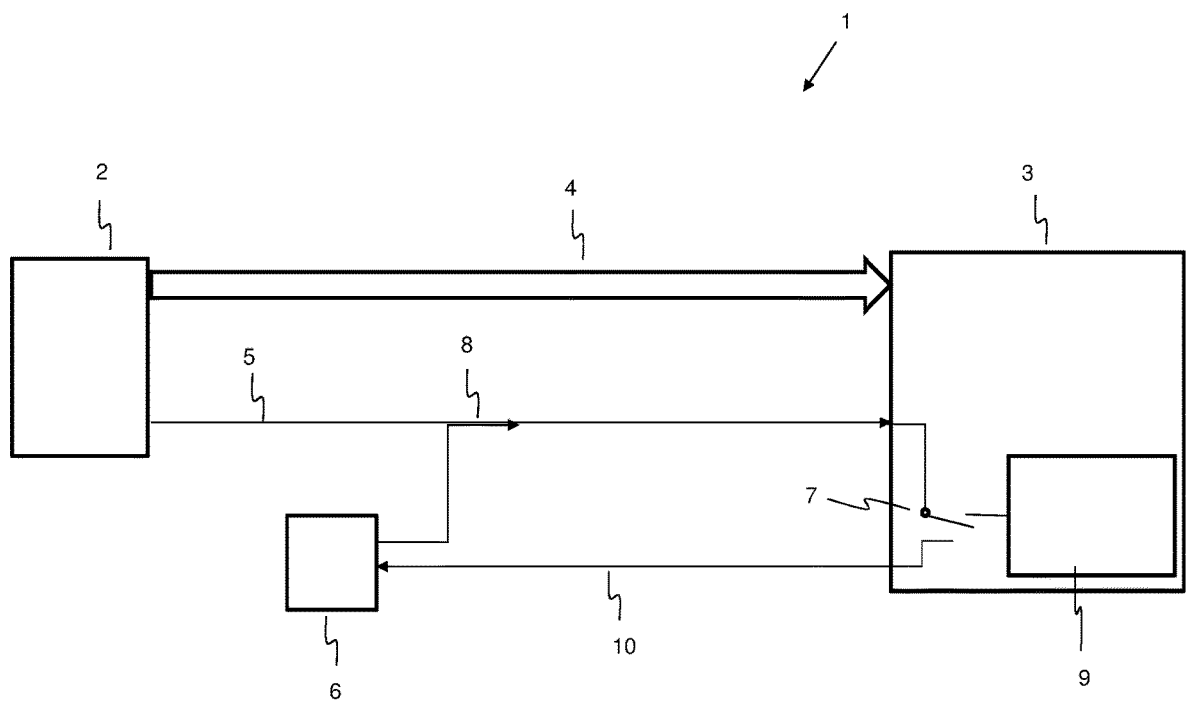
FIG. 1 is a schematic view of a system in accordance with a first embodiment of the disclosure.

A system in accordance with a first embodiment of the disclosure is shown in FIG. 1 and is generally designated at 1. A digital asset (such as a movie or sports game) is encrypted using an encryption key and sent from a data provider 2 to a data consumer 3 over a classical data channel 4. The encryption key is a series of 1's and 0's. The provider 2 encodes the encryption key using an error correction code with a redundancy of r, where r=n−k, where k is block length into which the key is divided for encoding and n is the block length of the encoded block after error coding. The provider 2 then modulates each bit of this error-encoded block onto a separate photon, resulting in a stream of modulated photons. Then, in the manner of known QKD techniques (such as BB84), each photon in this stream is prepared using one of two non-orthogonal basis states and transmitted to the consumer 3 via an optical fiber channel 5. If BB84 is being used, these non-orthogonal basis states could be, for example, horizontal and rectilinear. The apparatus used to modulate the photons and to prepare them in the desired basis states is known to the skilled person and so will not be described in detail here. The sequence of non-orthogonal basis states used to prepare the photons is known to the consumer 3.

Before the photon stream reaches the consumer 3, some additional photons are added to the stream by an intermediary device 6 via inlet channel 8. The intermediary device will be referred to as oracle 6. These additional photons replace some of the photons in the stream. The percentage of photons in the stream which are replaced by the oracle 6 increases with the background error rate, among other factors. The photons to be replaced are selected in a quasi-random or pseudorandom manner. The oracle 6 modulates these additional photons with a bit value of 0 and then prepares them in a basis state that the consumer 3 is not aware of. These additional photons will be referred to as "secret" photons. The oracle 6 records the bit value and time of transmission of each of the secret photons. The oracle 6 uses its own clock for this (not shown in the figures). The oracle's clock is synchronized to clocks at the provider 2 and consumer 3.

This process of encoding and transmitting the photon stream is repeated continuously. Thus the consumer 3 can "dip in" to the photon stream whenever the consumer 3 desires to obtain the encryption key. This avoids the need for the consumer 3 to make a special request for the encryption key.

In order to obtain the encryption key (so as to be able to decrypt the digital asset), the quantum receiver component 9 of consumer 3 must measure the transmitted photon stream using the sequence of non-orthogonal bases. As the consumer 3 is aware of this sequence of bases, making the measurement will reveal the correct bit value for the majority of the photons. However, the consumer 3 is not aware of the bases in which the secret photons were prepared. When a secret photon arrives at the consumer, the consumer will treat it like any other photon in the stream and so will measure it in the next basis in the sequence of non-orthogonal bases. This will not necessarily be the same as the basis in which the oracle 6 prepared it. In fact, approximately 50% of the time it will be different to the basis in which the oracle 6 prepared it. The laws of quantum physics mean that the act of measuring a photon using an incompatible basis causes information carried by the photon to be lost. Therefore, if the consumer 3 measures a photon in an incompatible basis, the consumer 3 cannot determine the bit value that was modulated onto the photon. Therefore, the consumer 3 will measure and record incorrect values for approximately 50% of the secret photons, leading to a typically 25% error rate, since he has a random chance of measuring the correct or incorrect value. It will be apparent that more sophisticated measuring strategies similar to those explored in BB84 will lead to a lower error rate, however, without knowledge of the correct measure the consumer 3 is unable to measure the secret photons with perfect fidelity.

The consumer 3 therefore measures the stream of photons and, using the same error correction code scheme as was used by the provider 2, reconstructs the encryption key. The consumer 2 can then use the encryption key to decrypt the digital content. This is possible despite the secret photons as the error code for the encryption key is chosen to have just sufficient redundancy to allow reconstruction of the encryption key from the imperfect measurements made by the receiver and the losses in the channel.

If the consumer 3 doesn't wish to decrypt the content, the consumer 3 closes a return switch 7. Closing the return switch 7 causes the photon stream to return to the oracle 6 via return channel 10. The oracle 6 then measures this returning photon stream using the sequence of basis states in which the stream was prepared. This results in a series of bit values. As no changes have been made to the photon stream since it was transmitted by the oracle 6, the series of bit values will match those that were modulated onto the stream, including in respect of the secret photons. There will however be some change to the values measured by the oracle 6 due to background error in scattered photons, as well as detector noise in the oracle measurement system (discussed further below).

It may be that the consumer measures the photon stream and so obtains the encryption key, but then falsely claims not to have done so. The consumer 3 may do this, for example, in order to avoid having to pay for the content. The consumer 3 may achieve this, for example, by modulating a second stream of photons using the bit values it measured from the first photon stream. The consumer 3 could then use a quantum transmitter to prepare those modulated photons according to its sequence of basis states and transmit them to the oracle 6. The oracle 6 measures this incoming photon stream using the sequence of basis states in which the first transmitted photon stream was prepared. As mentioned above, the consumer 3 will have measured incorrect bit values for approximately 25% of the secret photons. Thus, when the oracle 6 compares the bit values of this incoming second stream with the bit values of the first photon stream, some of the bit values will not match. Many of these non-matching values will be associated with the secret photons (although some arise from channel noise—see below). The presence of a significant number of non-matching values proves to the oracle 6 that the consumer 3 has measured the bit stream. The oracle 6 is therefore sure that the consumer 3 has been able to access the content, and therefore that the provider 3 has performed their part of the transaction. The oracle 6 then writes the transaction to the blockchain (not shown).

Figure 2:
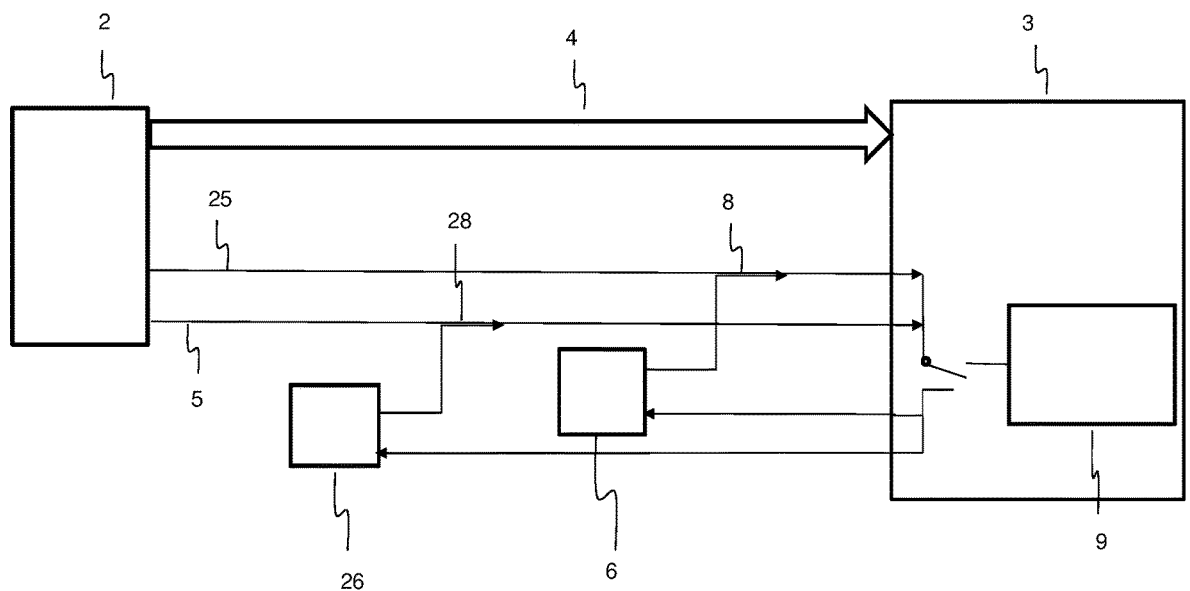
FIG. 2 is a schematic view of a system in accordance with a second embodiment of the disclosure.
Figure 3:
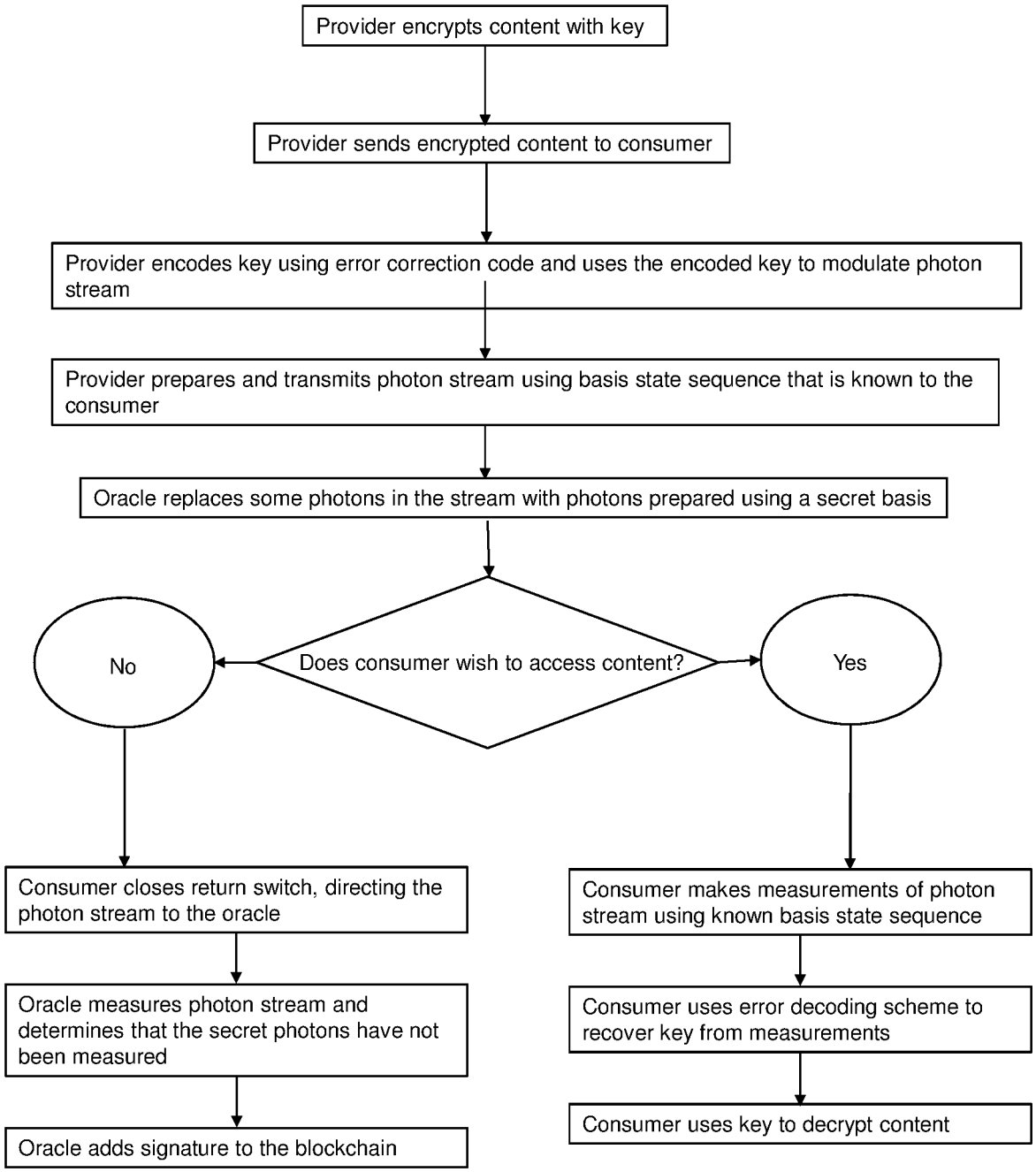
FIG. 3 is a flow chart of the process according to the first embodiment of the disclosure.

It may be that the consumer 3 does not return the photon stream to the oracle 6, falsely claiming to have never received it, e.g. because of a fault in the optical channel 5. In such a situation it is not possible for the oracle 6 to determine whether the consumer 3 has measured the photon stream and so obtained the key. This problem is addressed in a second embodiment of the disclosure by the use of an information dividing technique such as Shamir secret sharing. A system according to the second embodiment is shown in FIG. 2. Features of FIG. 2 share reference numerals with corresponding features of FIG. 1. In this second embodiment, there are two oracles 6, 26. The provider 2 splits the encryption key into portions and transmits each portion to a different one of the oracles 6, 26 via a respective optical fiber channel 5, 25. Each oracle 6, 26 adds secret photons and transmits its respective photon stream to the consumer 3 in the manner described above in relation to the first embodiment. The portions are large enough that the consumer 3 would need to combine all of them together in order to obtain the encryption key. Therefore, the consumer 3 need only return one stream to its oracle in order to prove that the consumer 3 had not measured the stream. In order to falsely claim not to have received the photon streams, the consumer 3 would have to claim not to have received any of the several streams (which is implausible). It will be apparent to one skilled in the art that other methods of dividing the stream in to multiple parts which can be sent in parallel by channels, and which require all or a minimum number of parts to be received to recover the original secret could be equivalently used instead of Shamir secret sharing in this method. For example a decomposition which must be recombined by a bitwise parity operator to reconstruct the original data stream could be used. A way of constructing such a decomposition of a single digital stream into n streams would be to use a random number generator to generate the next bit value for each of the n−1 streams, and then set the bit value of the nth stream so that the total parity of the bits is equal to the next bit value of the original data stream as encoded using the error correcting code.

Loss

Many of the photons transmitted by the oracle will be lost before reaching the consumer 3. The loss is proportional to the length of the optical path, e.g. in a 15 km channel, approximately 50% of the photons will be lost. As mentioned above, an error correction code is applied to the data before it is encoded as qubits on the quantum channel in order to allow the receiver to reconstruct the correct data stream after measurement. This mitigates the combined effects of loss, natural error and the error inducing effect of deliberately inserted secret photons. An example of a suitable error correction code is LDPC (Low Density Parity Code). This error code adds redundancy (i.e. extra data) to the stream. This redundancy is large enough to allow the consumer 3 to reconstruct the data (so as to form the encryption key) despite the loss. However, the redundancy is tailored so as not to be so large as to enable the consumer 3 to reconstruct the key without measuring a significant number of secret photons. If more than the minimum necessary error correction code redundancy was applied, this could enable the consumer 3 to convince the oracle 6 that the consumer 3 had not measured the photon stream, when in fact it had.

Noise

Noise on the optical fiber channel 5 could cause the oracle 6 to incorrectly measure some of the photons that has been returned by the consumer 3. The oracle 6 may mistakenly determine that these incorrect measurements were caused by the consumer 3 measuring the secret photons. This invention addresses this problem by making the number of secret photons added to the stream dependent on the background error rate on the channel. The higher the background error rate, the more secret photons are added. This results in the number of mismatched bit values being noticeably higher if the consumer 3 has measured the photon stream than if the consumer 3 has not measured the photon stream.

The invention claimed is:

1. A method of transmitting quantum-encrypted data from a quantum transmitting apparatus to a quantum receiving apparatus, the method comprising:
    indicating to a quantum receiving apparatus that a first sequence of mutually non-orthogonal bases will be used to prepare at least some of a plurality of bits in quantum states; and
    at a first quantum transmitting apparatus, preparing each of the plurality of bits in a respective one of a second sequence of mutually non-orthogonal bases, to give a plurality of qubits,
    wherein the second sequence of mutually non-orthogonal bases is different from the first sequence of mutually non-orthogonal bases,
    wherein preparing each of the plurality of bits in the respective one of the second sequence of mutually non-orthogonal bases comprises preparing each of the plurality of bits in a respective one of the first sequence of mutually non-orthogonal bases, and then replacing a portion of resulting qubits with replacement qubits prepared according to bases not known to the quantum receiving apparatus, and
    wherein replacing the portion of resulting qubits is performed by a second quantum transmitting apparatus and comprises transmitting the replacement qubits onto an optical channel via an optical inlet in the optical channel.

2. The method as claimed in claim 1, further comprising, at the quantum receiving apparatus, measuring the plurality of qubits according to the second sequence of mutually non-orthogonal bases.

3. The method as claimed in claim 1, wherein the second quantum transmitting apparatus is located in an intermediary device which is a separate device from the first quantum transmitting apparatus.

4. The method as claimed in claim 3, wherein the intermediary device is trusted to write transactions to a blockchain.

5. The method as claimed in claim 1, wherein the quantum receiving apparatus returns the transmitted plurality of qubits to the first quantum transmitting apparatus.

6. The method as claimed in claim 5, wherein the first transmitting apparatus measures bit values of the returned plurality of qubits using a quantum receiver.

7. The method as claimed in claim 6, wherein the first quantum transmitting apparatus compares the bit values of the returned plurality of qubits with the bit values of the transmitted plurality of qubits and if more than a threshold proportion of the compared bit values do not match, the first quantum transmitting apparatus determines that the quantum receiving apparatus has measured the plurality of qubits.

8. A system for transmitting quantum-encrypted data from a quantum transmitting apparatus to a quantum receiving apparatus, the system comprising:
    a quantum transmitting apparatus comprising at least one processor and memory; and
    a quantum receiving apparatus comprising at least one processor and memory,
    wherein the quantum transmitting apparatus is operable to indicate to the quantum receiving apparatus that a first sequence of mutually non-orthogonal bases will be used to prepare at least some of a plurality of bits in quantum states, the quantum transmitting apparatus being further operable to prepare each of a plurality of bits in a respective one of a second sequence of mutually non-orthogonal bases, to give a plurality of qubits, and wherein the second sequence of mutually non-orthogonal bases is different from the first sequence of mutually non-orthogonal bases, wherein preparing each of the plurality of bits in the respective one of the second sequence of mutually non-orthogonal bases comprises preparing each of the plurality of bits in a respective one of the first sequence of mutually non-orthogonal bases, and then replacing a portion of resulting qubits with replacement qubits prepared according to bases not known to the quantum receiving apparatus, and wherein replacing the portion of resulting qubits is performed by a second quantum transmitting apparatus and comprises transmitting the replacement qubits onto an optical channel via an optical inlet in the optical channel.

9. A method of transmitting quantum-encrypted data from a quantum transmitting apparatus to a quantum receiving apparatus, the method comprising:
    indicating to a quantum receiving apparatus that a first sequence of mutually non-orthogonal bases will be used to prepare at least some of a plurality of bits in quantum states; and
    at a first quantum transmitting apparatus, preparing each of the plurality of bits in a respective one of a second sequence of mutually non-orthogonal bases, to give a plurality of qubits, wherein the second sequence of mutually non-orthogonal bases is different from the first sequence of mutually non-orthogonal bases, wherein the quantum receiving apparatus returns the transmitted plurality of qubits to the first quantum transmitting apparatus, and wherein the first transmitting apparatus measures bit values of the returned plurality of qubits using a quantum receiver.

10. The method as claimed in claim 9, wherein:

the first quantum transmitting apparatus compares the bit values of the returned plurality of qubits with the bit values of the transmitted plurality of qubits and determines whether a threshold proportion of the compared bit values do not match, and in response to determining that the threshold proportion of the compared bit values do not match, the first quantum transmitting apparatus determines that the quantum receiving apparatus has measured the plurality of qubits.

11. A system for transmitting quantum-encrypted data from a quantum transmitting apparatus to a quantum receiving apparatus, the system comprising:

a quantum transmitting apparatus comprising at least one processor and memory; and a quantum receiving apparatus comprising at least one processor and memory, wherein the quantum transmitting apparatus is operable to indicate to the quantum receiving apparatus that a first sequence of mutually non-orthogonal bases will be used to prepare at least some of a plurality of bits in quantum states, the quantum transmitting apparatus being further operable to prepare each of a plurality of bits in a respective one of a second sequence of mutually non-orthogonal bases, to give a plurality of qubits, and wherein the second sequence of mutually non-orthogonal bases is different from the first sequence of mutually non-orthogonal bases, wherein the quantum receiving apparatus returns the transmitted plurality of qubits to the first quantum transmitting apparatus, and wherein the first transmitting apparatus measures bit values of the returned plurality of qubits using a quantum receiver.

* * * * *